March 8, 1927.  1,620,485
W. T. NORTON, JR
VEHICLE BRAKE
Filed Dec. 24, 1921  3 Sheets-Sheet 1
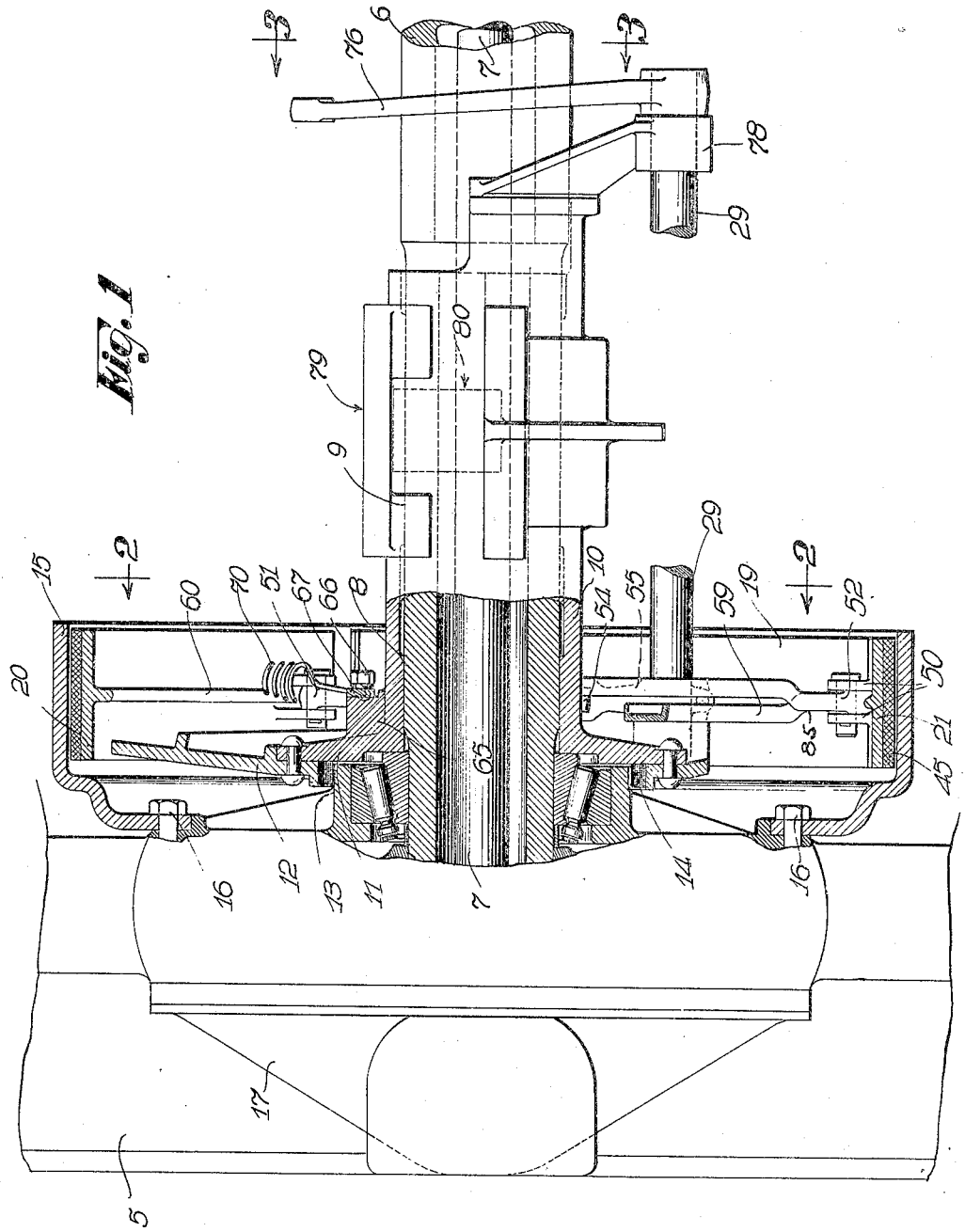
Inventor
William T. Norton Jr.
By Brown, Boettcher & Dienner
Attorneys

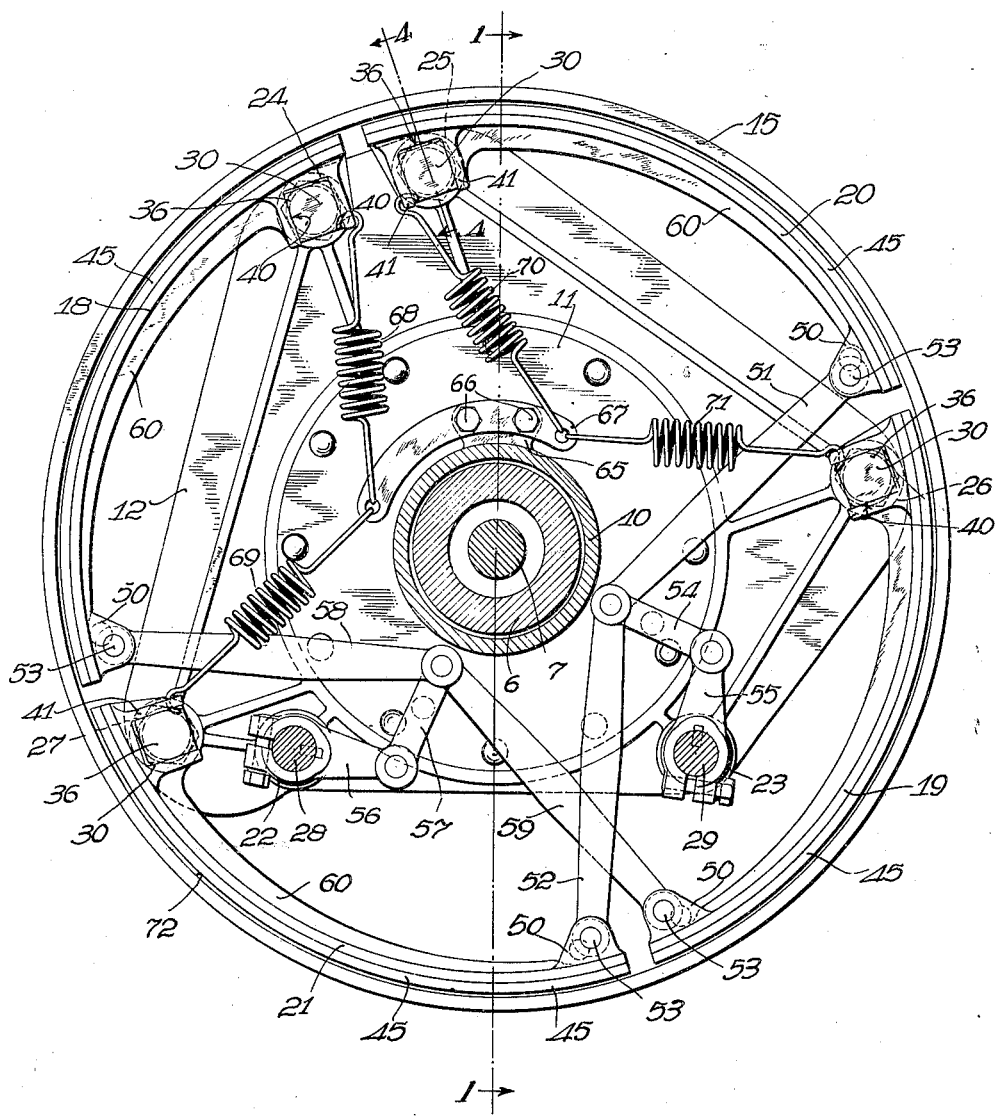

March 8, 1927.

W. T. NORTON, JR

VEHICLE BRAKE

Filed Dec. 24, 1921

Inventor
William T. Norton Jr.
By Brown, Boettcher & Dienner
Attorneys

Patented Mar. 8, 1927.

1,620,485

UNITED STATES PATENT OFFICE.

WILLIAM T. NORTON, JR., OF CHICAGO, ILLINOIS.

VEHICLE BRAKE.

Application filed December 24, 1921. Serial No. 524,588.

My invention relates to motion arresting devices, and more particularly to brake devices for checking or stopping the motion of motor vehicles and the like.

The brake mechanism of a motor vehicle is called upon to meet a wide range of varying conditions and must necessarily perform satisfactorily at all times. The single acting type of brake is going out of use. It binds only when the drum is revolving in one direction and has very little grip when the drum is revolving in the other direction and cannot be depended upon to hold the vehicle, for example, against movement down hill backward. Brakes of the external contracting type are short-lived and unsatisfactory, especially for truck or other heavy duty service. Of the prior art braking devices, those of the internal double-acting type are superior.

My invention belongs to this latter class, although certain aspects of the invention are not to be so limited, but are capable of wider and more general use.

It is an object of my invention to provide a brake, the functioning of which will be an improvement over the functioning of the devices of the prior art.

Another object of my invention is to improve the mechanical construction, assembly and relation between the parts of such devices.

A further object of my invention is the provision of an improved, simple, compact and efficient brake having manufacturing economy and structural superiority, as well as functional advantage over the devices of the prior art.

A still further object of my invention is the provision of a brake, in which assembling and dismantling is facilitated and which will permit of ready access, and convenient dismantling, without removal of the wheel.

Further objects and advantages of my invention will appear from the following detailed description, and the claims, taken with an inspection of the accompanying drawings, in which:

Figure 1 is a vertical sectional view through a brake embodying my invention, taken substantially on the line 1—1 of Fig. 2; the associated wheel and axle being shown partially in section and partially in elevation.

Fig. 2 is a vertical sectional view taken on the line 2—2 of Fig. 1;

Figure 4:
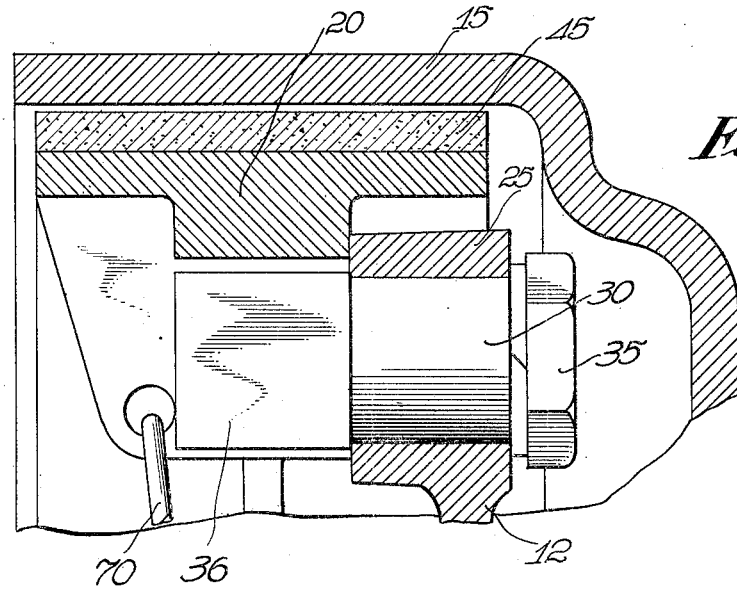
Fig. 4 is an enlarged fragmentary longitudinal section taken on the line 4—4 of Fig. 2.

With reference now to the drawings, 5 designates a drive or traction wheel of a motor vehicle, and 6 designates generally the drive axle associated therewith. While the driving shaft 7 is preferably connected to drive the wheel 5 through a drive mechanism of the type disclosed in my co-pending application, Serial Number 524,587, filed December 24, 1921, this connection may be varied in so far as my present invention is concerned.

Pressed onto the axle housing or tube 6, is a sleeve member 10, keys at the points 8 and 9 serving to hold the same properly positioned during the pressing operation. The sleeve 10 terminates at its outer end, in a radial flange 11, secured to the outer face of a mounting or base member 12. The base member 12 is provided with an axial opening into which the hub portion 13 of the wheel 5 extends, and a packing ring 14 of fibrous or other suitable material, carried by the member 12, co-operates with the radial flange 11 to prevent the escape of lubricant out through the joint therebetween.

A drum 15 of the usual or any preferred formation, secured to the inner face of the wheel 5, as by means of bolts 16, which may extend through to secure a cover or closure member 17 to the outer face of the wheel, provides an inner circumferential surface, into cooperation with which two pairs of segmental brake shoes 18—19 and 20—21 are arranged to be expanded, in a manner which will be made apparent as this description proceeds. These shoes which are faced with a friction composition or material, such as asbestos or the like as shown at 45 are positioned in substantially the same plane and operate along substantially the same circumferential path within the drum 15.

The base or mounting member 12 is provided with a plurality of integral hollow bosses or hubs 22—23—24—25—26 and 27. Parallel brake shafts 28 and 29 extend transversely between the opposite wheels of the vehicle in the usual manner and are rotatably mounted at their opposite ends in the hollow bosses or hubs 22 and 23, at the respective wheels. Posts 30, keyed, splined or otherwise fixed in the hubs 24, 25, 26 and 27 respectively, against rotation and secured against axial displacement by suitable nut members 35, are provided with projecting portions 36 squared as shown, or otherwise formed to provide suitable guide surfaces. These guide surfaces, which are shown as being parallel, are positioned non-radial, or at an angle to radii extended from the axis of the drum 15 and project into guideways 40 provided by pairs of non-radial flanges 41 at one end of each of the segmental shoes 18—19—20 and 21.

The opposite ends of each of the said segmental shoes 18—19—20 and 21 are provided with a pair of projecting ears or lugs 50. Integral webs 60 are preferably formed along the inner peripheries of the respective shoes between the flanges 41 and lugs 50 as shown. Arms or links 51 and 52, pivotally secured as through pins 53, between the lugs 50, carried by the shoe 20 and the lugs carried by the shoe 21, extend as shown in Fig. 2, and are pivotally connected at their adjacent ends to a link 54, the opposite end of which link is pivoted in the forked or bifurcated end of an arm 55. The arm 55 is keyed or otherwise fixed upon the brake operating shaft 29.

A similar arm 56, fixed upon the brake operating shaft 28, is pivotally connected at its free end with a link 57, which link is in turn pivotally connected at its opposite end between the adjacent ends of arms 58 and 59, the opposite ends of which arms are pivotally secured between the lugs 50 carried by the shoe 18 and the lug carried by the shoe 19, respectively. The arms 51, 52, 54 and 55, form a toggle mechanism for operating the shoes 20 and 21, while the arms 56, 57, 58 and 59, form a similar mechanism for operating the shoes 18 and 19 along the same circumferential path in the drum 15.

Adjacent the flange 11, the sleeve 10 is provided with a shoulder or radial boss 65, to which is secured as by means of suitable bolts 66, a segmental strip or arm 67.

Coiled springs 68 and 69 are connected between one end of the arm 67 and the flanged ends of the shoes 18 and 21 respectively, as shown in Figs. 2 and 4, and serve with springs 70 and 71, connected between the opposite end of the arm 67 and the shoes 19 and 20 respectively, to maintain the parts in the position shown in Fig. 2, a slight clearance 72 being shown between the inner periphery of the drum 15 and the co-operating faces 45 of the respective shoes at such time.

Figure 3:
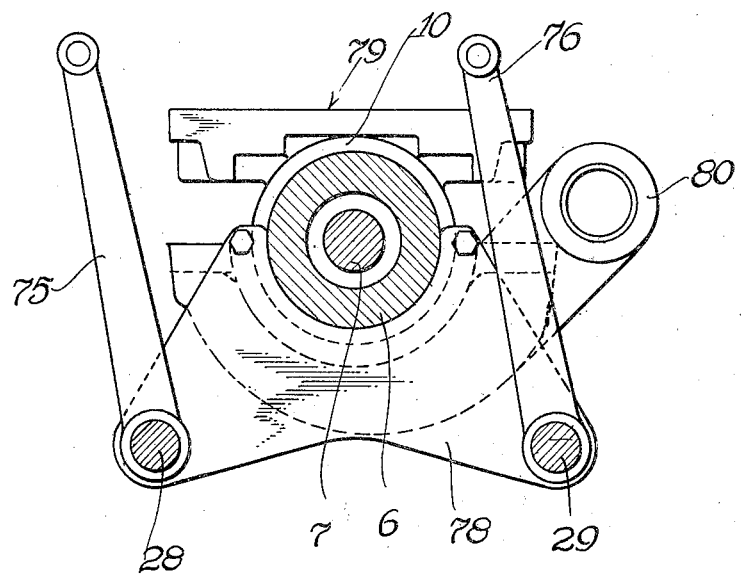
Fig. 3 is a vertical section taken on the line 3—3 of Fig. 1.

The shaft 28 is turned to operate the shoes 18—19 by means of a lever 75, fixed thereupon, as shown in Fig. 3. The shaft 29 is turned by a similar lever 76, fixed thereupon.

The shafts 28 and 29 may be supported within their length in bearing brackets 78, secured to the inner ends of the sleeve members 10. The sleeve members 10 are preferably made up to provide mounting surfaces 79, for the usual supporting springs of the vehicle. Projecting brackets 80 provide for the attachment of the usual radius rods.

From the foregoing it will now be apparent that the shaft 29 is rotated by the lever 76, and that rotation of the shaft 29 operates the toggle mechanism between the shoes 20 and 21, which in turn expands or moves the brake shoes 20 and 21 into braking engagement with the in erior circumferential surface of the drum 15. The movement of the shoes into co-operation with the drum is partially a radial and partially a circumferential movement, with the result that not only are those ends of the shoes connected with the links 51 and 52 moved into proper engagement with the drum, but the opposite ends of the shoes are directed outwardly into proper co-operation with the drum 15, by the guide portions 36 of the posts 30. The result is a uniform gripping engagement over the entire braking surface, not only improving the braking action, but increasing the life of the friction facings of the respective shoes. The operation of the other pair of shoes 18 and 19 is similar to that of the shoes 20 and 21.

It is believed that the simplicity, compactness, manufacturing economy, assembling and structural superiority of the brake of my invention are obvious. Not only, are the respective shoes and the various parts of the toggle mechanisms employed at the drum 15 identical, but these parts are identical at each of the opposite wheels of the vehicle. Manufacture and replacement is facilitated and cost decreased. The lugs 50 may be arranged in the same plane and the levers 51—52 and 58—59 offset within their length as shown at 85 in Fig. 1. The base 12 at the opposite wheel is identical with the one shown, being simply turned about its axis through the angle necessary to properly position the bosses or hubs 22, 23, 24, 25, 26 and 27, and then secured to the flange 11. Ready access to the several parts is permitted and the brake shoes are adapted to be moved longitudinally from the respective guide members, then circumferentially to the lower part of the wheel and removed without removing the wheel. This is a distinct advantage. Ready removal of the other parts is likewise permitted without removing the wheel.

I do not intend to limit the invention to the details of the particular embodiment which I have elected to describe, as I am aware, and contemplate, that modifications and changes may be made without departing from the invention which is set out in the appended claims. Certain aspects of the invention, such as, for example, the provision of a brake adapted for removal without removing the wheel, and the provision for applying the brake members uniformly over their entire braking surfaces are not to be limited to the type of brake shown.

I claim:

1. In combination, a wheel, an axle for carrying the said wheel, a brake drum on said wheel, brake members selectively operable along substantially the same circumferential path on said drum, means for supporting and operating said brake members, said means permitting removal of the brake members from the wheel and axle without necessitating axial movement of the wheel, and means for applying said members uniformly to the drum.

2. In combination, a wheel, an axle for carrying the said wheel, a brake drum on said wheel, brake members selectively operable along substantially the same circumferential path on said drum, means for supporting and operating said brake members, said means permitting removal of the brake members from the wheel and axle without necessitating axial movement of the wheel and means comprising a non-radial guide for directing the braking member into cooperation with the drum.

3. In combination, a wheel, an axle for carrying the said wheel, a brake drum on said wheel, brake members selectively operable along substantially the same circumferential path on said drum, means for supporting and operating said brake members, said means permitting removal of the brake members from the wheel and axle without necessitating axial movement of the wheel and means for directing the brake members into cooperation with the drum obliquely to the direction of the operating force.

4. In combination, a wheel, an axle for carrying the said wheel, a brake drum on said wheel, brake members selectively operable along substantially the same circumferential path on said drum, means for supporting and operating said brake members, said means permitting removal of the brake members from the wheel and axle without necessitating axial movement of the wheel and means comprising a non-radial guide for directing an end of each of the brake members into cooperation with the inner circumferential surface of the drum.

5. In combination, a brake drum, brake members associated with the said drum and movable along substantially the same circumferential path on the said drum, toggle means for selectively operating the said members, and means for applying said members uniformly to the drum.

6. In combination, a brake drum, brake members associated with the said drum and movable along substantially the same circumferential path on the said drum, toggle means for selectively operating the said members, and means comprising a non-radial guide for directing the braking members into cooperation with the drum.

7. In combination, a brake drum, brake members associated with the said drum and movable along substantially the same circumferential path on the said drum, toggle means for selectively operating the said members, and means for directing the brake members into cooperation with the drum obliquely to the direction of the operating force.

8. In combination, a brake drum, brake members operable in substantially the same plane and movable along the same circumferential path on the said drum, toggle means for operating said members selectively in pairs and means for directing an end of each of the brake members into cooperation with the inner circumferential surface of the drum.

9. In combination, a brake drum, a base member, a pair of operating shafts journaled in said base member, two pairs of brake members operable in substantially the same plane and movable along the same circumferential path on the said drum, operating connections between the operating shafts and said pairs of brake members for operating the said members selectively in pairs, guideways in the said base member, and guide posts carried by the said base member cooperating with the guideways in directing the brake members into cooperation with the drum obliquely to the direction of the operating force.

10. In combination, a brake drum, a plurality of conversely opposed shoes associated with said drum, relatively immovable elements associated with an end of each of said shoes arranged to cause circumferential and creeping movement of each of said shoes to wedge them against said drum, and toggle mechanism associated with another end of each of said shoes for urging said end obliquely against said drum.

In witness whereof, I hereunto subscribe my name this 21 day of December, 1921.

WILLIAM T. NORTON, Jr.